(12) United States Patent
Coile et al.

(10) Patent No.: US 6,598,081 B1
(45) Date of Patent: Jul. 22, 2003

(54) METHOD AND APPARATUS FOR ELIMINATING USE OF A TRANSFER PROTOCOL ON A PROXIED CONNECTION

(75) Inventors: Brantley W. Coile, Athens, GA (US); Richard A. Howes, Roswell, GA (US); William M. LeBlanc, Athens, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/929,825

(22) Filed: Aug. 13, 2001

Related U.S. Application Data

(63) Continuation of application No. 09/430,273, filed on Oct. 29, 1999, now Pat. No. 6,298,380, which is a continuation of application No. 08/903,823, filed on Jul. 31, 1997, now Pat. No. 6,006,268.

(51) Int. Cl.[7] ............................................. G06F 15/16
(52) U.S. Cl. ...................... 709/227; 709/203; 709/219; 709/224; 709/228; 709/229
(58) Field of Search ................................ 709/227, 203, 709/219, 224, 228, 229

(56) References Cited

U.S. PATENT DOCUMENTS

| | | | |
|---|---|---|---|
| 5,319,712 A | 6/1994 | Finkelstein et al. | 380/44 |
| 5,592,611 A | 1/1997 | Midgely et al. | 714/4 |
| 5,778,174 A | 7/1998 | Cain | 713/201 |
| 5,781,550 A | 7/1998 | Templin et al. | 370/401 |
| 5,802,320 A | 9/1998 | Baehr et al. | 709/249 |
| 5,828,846 A | 10/1998 | Kirby et al. | 709/238 |
| 5,941,988 A * | 8/1999 | Bhagwat et al. | 713/201 |
| 6,006,268 A | 12/1999 | Coile et al. | 709/227 |
| 6,052,788 A * | 4/2000 | Wesinger, Jr. et al. | 713/201 |
| 6,167,438 A * | 12/2000 | Yates et al. | 709/216 |
| 6,182,141 B1 * | 1/2001 | Blum et al. | 709/227 |

* cited by examiner

*Primary Examiner*—Saleh Najjar
(74) *Attorney, Agent, or Firm*—Baker Botts L.L.P.

(57) ABSTRACT

A method for eliminating use of a transfer protocol on a proxied connection includes deriving a client originated packet sequence synchronization factor and a server originated packet sequence synchronization factor. The method further includes adjusting a client originated data acknowledgement number and a client originated data sequence number based on the client originated packet sequence synchronization factor, and adjusting a server originated data sequence number and a server originated data acknowledgement number based on the server originated packet sequence synchronization factor. The method also includes initiating a non-participating application that is not participating in the transfer protocol.

31 Claims, 10 Drawing Sheets

$\Delta_1 = seq_1 - ack_1 = ack_S - seq_C$ $\Delta_2 = seq_2 - ack_2 = ack_C - seq_S$

METHOD AND APPARATUS FOR ELIMINATING USE OF A TRANSFER PROTOCOL ON A PROXIED CONNECTION

CROSS REFERENCE TO RELATED APPLICATIONS

This application is related to U.S. Pat. No. 6,473,406, issued Oct. 29, 2002, entitled "Transparently Proxying a Connection," which is incorporated herein by reference for all purposes.

This application is a continuation of application Ser. No. 09/430,273, filed Oct. 29, 1999 now U.S. Pat. No. 6,298,380, which is a continuation of Ser. No. 08/903,823 now U.S. Pat. No. 6,006,268, filed Jul. 31, 1997.

This application is related to co-pending U.S. application Ser. No. 08/903,718, entitled Transparently Proxying a Connection, filed Jul. 31, 1997, which is incorporated herein by reference for all purposes.

BACKGROUND OF THE INVENTION

1. Field of the Invention

The present invention relates generally to methods and apparatuses for reducing overhead on a proxied connection. More specifically, the invention relates to a cut through proxy that makes two separate connections and then modifies packets from one connection so that they may be transferred to another connection without the need to keep a TCP Transmission Control Block (TCB) for each connection. The cut through proxy can perform stateful inspection of the packets as they are transferred from one connection to the other.

2. Description of the Related Art

Proxies

In many network applications, it is often desirable or necessary to prevent a user from making a connection to a first machine at one IP address that has information that the user needs and instead service an information request with a second machine at a different IP address. For example, it is often desired from a security standpoint not to allow a connection to a machine that stores sensitive information. Instead, it may be required that a connection first be made to a proxy which has varous security features such as user authentication and possibly encryption. The user requests the information from the proxy and the proxy establishes a connection with the machine that is being protected and obtains the information. If the proxy determines that the user is authorized to receive the information, the proxy can then relay the information to the user that requested it. The proxy thus stands in for the machine that stores the sensitive information. The user is prevented from making a direct connection to the protected machine. Instead, the user must first request the information from the proxy and only the proxy connects with the protected machine. The protected machine is insulated from potentially dangerous outside contact.

In a proxy arrangement that is used for security, the proxy generally first identifies and authenticates the user who is requesting information from a machine at a target IP address. In the discussion that follows, the user requesting information will be referred to as the client and the protected machine that is providing information will be referred to as the server. It should be noted that in certain situations the client and server designations may be reversed. The machine that is protected (in the example above, the server) is referred to as the proxied machine at the proxied address. The proxied machine is also referred to as the target machine at the target address because it is the machine that the client or user actually intends to access and obtain data or some other service. The target machine is distinguished from the proxy because the user does not generally desire to retrieve information from or contact the proxy other than for the purpose of authenticating himself or otherwise preparing for the desired connection with the target machine. The machine that acts as a proxy is called the proxy machine at the proxy address. The user making the connection is referred to as the user or the client. When a proxy is used, the user connects to the proxy machine at the proxy IP address and never actually makes a connection to the proxied machine at the proxied IP address.

Another example of a situation in which a proxy may be desirable is a web cache. A web cache is not necessarily implemented for the purpose of protecting another machine. It may be desirable to store certain information that is available from a primary web site at a first IP address at a web cache located at another IP address. In this situation, the user is directed to the IP address of the web cache for the information, and, if the information requested is not found in the cache, then the web cache connects to the IP address of the first web site, obtains the information, and then transfers it to the user.

Conventional Proxy Overhead

A conventional proxy terminates two separate connections: one with the client on one side and one with the server on the other side. Once information is received through the TCP stack on one side, the proxy application checks it to determine whether it is acceptable for sending to the other side. If the information is acceptable, then the proxy sends the information through the TCP stack on the other side and receives any responses via that TCP connection.

The proxy must have a significant amount of overhead processing power and memory devoted to maintaining a connection with the client and then storing information sent by the client so that it may be passed along to the server because a full TCP connection is terminated between the client and the proxy as well as between the server and the proxy. Memory overhead associated with a terminated TCP connection includes storage space for each packet or datagram that is sent as well as storage for incoming packets. It should be noted that in the following description the terms datagram and packet are used interchangeably to refer to messages or portions of messages sent to or from a network device. Each packet that is sent must be stored so that it may be resent if an error occurs or it is not timely acknowledged. Likewise, each packet that is received must be acknowledged and stored for reassembly into a message once the other packets in the message have been received.

It is also necessary to keep track of and update sequencing information. Packets are not generally received in the proper order and so the TCP protocol provides for sequence information to be included in each packet header so that received packets may be assembled in the proper order into a message.

The need for a proxy to terminate a connection both with the client and the server thus creates a large amount of processing overhead as well as memory requirements. Terminating the two connections further requires a large number of data copies which slow down the connections. Information is first copied from the physical layer to the IP layer which is contained in the system/kernel and then from system memory to user memory so that it is accessible to the proxy application. Data is then copied from user memory back to system memory so that the proxy can relay the packets to the target or server. All of these copies take a considerable amount of processing time and may cause the client to experience a slow connection.

The proxy must have a large memory and a large amount of processing capability in order to task switch among managing the various connections that it supports at any given time. Supporting the connections requires considerable overhead because each packet that is received by the proxy must be acknowledged. Each packet that is sent by the proxy must be stored and its state must be tracked so that the acknowledgment from the receiver of the packet, whether the client or the server, can be noted or a request from the client or the server to resend the packet can be noted and fulfilled. In addition, the proxy must calculate and store a check sum for each packet that is received to ensure the integrity of the data contained in the packet. Thus, the state of both the connections must be tracked and the actual data sent in packets must be repeatedly copied and stored in a conventional proxy.

The operation of a conventional proxy can be further understood by referring to the network layers implemented on the proxy. The basic problem of networking a set of devices has been divided into layers. The bottom layer is a physical layer. It handles the actual physical connections between devices. The second layer is the data link layer. It describes how the data is formatted which is on the physical medium which connects the devices. The third layer is the network layer. It handles cases where there is greater than one connection per machine. The fourth layer is the transport layer. This determines that all of the messages from a source reach the destination reliably and in an unduplicated fashion.

The second layer is subdivided into a Logical Link Control ("LLC") layer and a Media Access Control ("MAC") layer. A MAC address is required in this layer. In the TCP/IP suite of protocols employed on the Internet, the third layer or network layer is the IP layer. This layer requires a globally unique IP address in order to route packets to the right physical machine. Also, in TCP/IP, the fourth layer or transport layer is the TCP layer. The TCP layer additionally requires a machine port number so that the packet is sent to the correct port of a specific machine. The application layer sits on top of these layers, handling messages that have been assembled from packets by TCP. The orderly receipt and accuracy of the packets is also managed by TCP In a conventional proxy, security is implemented at the application layer. Thus, the problem with a standard proxy may be stated in terms of the need to pass data received at the physical layer from ethernet or some other standard physical network implementation up through the IP layer and the TCP layer to the application layer. Processing data according to the protocol implemented at each layer requires a significant amount of memory as well as processing overhead for numerous data copies.

What is needed is a way to implement a proxy while reducing the overhead required to pass data among the various layers.

SUMMARY OF THE INVENTION

Accordingly, the present invention provides a cut through proxy that manages a connection from a client to a server initially by fully proxying the connection. Once the cut through proxy determines that the connection is suitable to be unproxied, the cut through proxy routes packets through a nonparticipating application that performs stateful inspection of packets that are sent between the client and the server. Packets are modified so that they may be transferred from one side of the cut through proxy to the other without the need to keep a Transmission Control Block (TCB) for each connection. Instead, a smaller connection object is maintained that contains the information necessary to preserve the ability of the client and the server to sequence and check packets without requiring the cut through proxy to terminate connections to the client or the server.

It should be appreciated that the present invention can be implemented in numerous ways, including as a process, an apparatus, a system, a device, a method, or a computer readable medium. Several inventive embodiments of the present invention are described below.

In one embodiment, a system and method are disclosed for bypassing a participating application that receives data from a client connection between a proxy and a client and receives data from a server connection between a proxy and a server is disclosed. The method includes deriving a client originated packet sequence synchronization factor. The client originated packet sequence synchronization factor is derived from the difference between a last data sequence number sent by the participating application to the server and a last data acknowledgment number sent by the participating application to the client. A server originated packet sequence synchronization factor is derived from the difference between a last data sequence number sent by the participating application to the client and a last data acknowledgment number sent by the participating application to the server. A server originated data sequence number of a packet sent from the server to the client is adjusted using the server originated packet sequence synchronization factor. A client originated the data acknowledgment number of a packet sent from the client to the server is adjusted using the server originated packet sequence synchronization factor. A client originated data sequence number of a packet sent from the client to the server is adjusted using the client originated packet sequence synchronization factor. A server originated data acknowledgment number of a packet sent from the server to the client is adjusted using the client originated packet sequence synchronization factor. As a result, the data sequence and acknowledgment numbers are synchronized between the client and the server.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Figure 1:
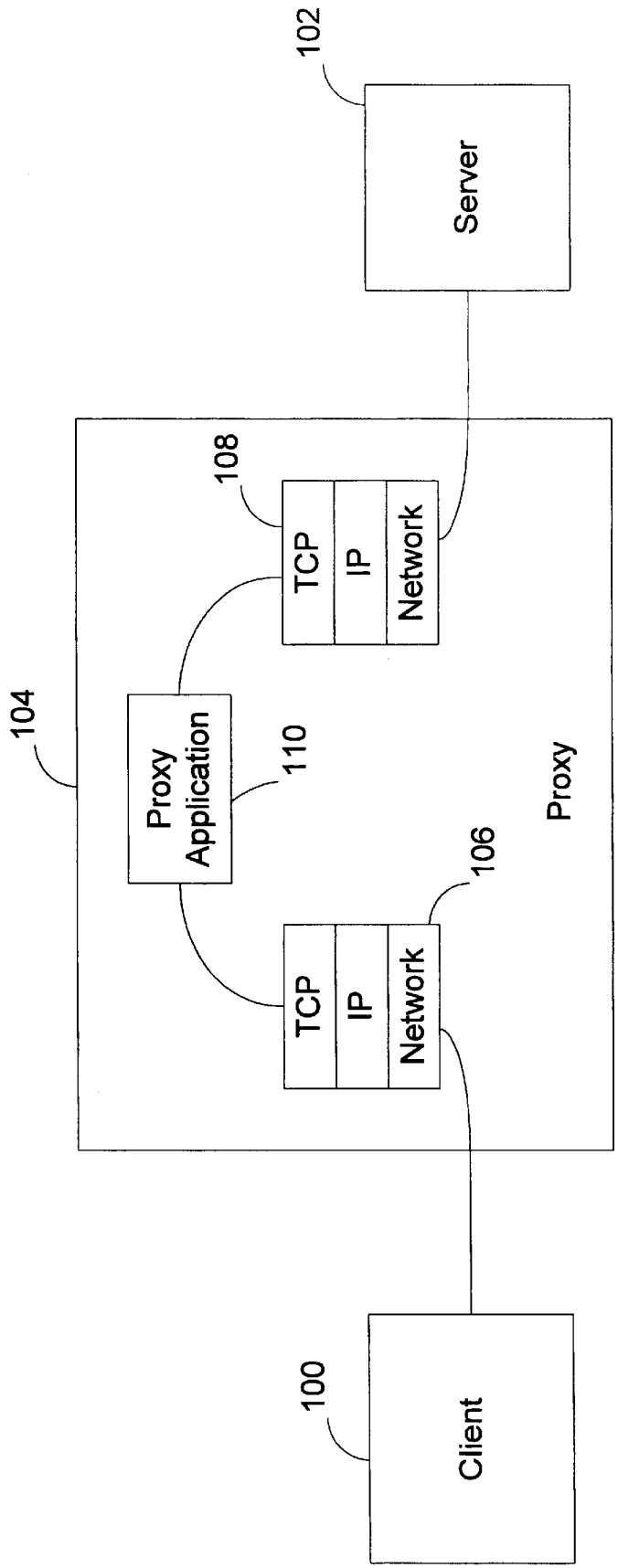
FIG. 1 is a block diagram illustrating a fully proxied connection.

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

TCP/IP

The present invention will be described as being implemented by modifying packets sent using TCP/IP. It should be recognized that other protocols may be similarly modified in other embodiments. TCP/IP was developed in the mid 1970s when the Defense Advanced Research Project Agency (DARPA) was interested in providing packet-switched network communications between the many research institutions in the United States. DARPA and other government organizations understood the potential of packet-switched technology and were just beginning to discover that virtually all companies with networks needed to support communication among dissimilar computer systems.

With the goal of heterogeneous connectivity in mind, DARPA funded research by Stanford University and Bolt, Beranek, and Newman to create a series of communication protocols. The result of that development effort, completed in the late 1970s, was the Internet protocol suite, of which the Transmission Control Protocol (TCP) and the Internet Protocol (IP) are the two best-known members.

TCP

TCP is a connection-orientated transport layer protocol that sends data as an unstructured stream of bytes. By using sequence numbers and acknowledgment messages, TCP can provide a sending node with delivery information about packets transmitted to a destination node. Where data has been lost in transit from source to destination, TCP can retransmit the data until either a timeout condition is reached or until successful delivery has been achieved. TCP can also recognize duplicate messages and will discard them appropriately. If the sending computer is transmitting too fast for the receiving computer, TCP can employ flow control mechanisms to slow data transfer. TCP can also communicate delivery information to the upper-layer protocols and applications it supports. As a result of these capabilities, TCP is a connection oriented protocol. The information required for the sequencing, acknowledgment, and error correcting referred to above is stored and accessed by TCP in a data structure referred to as a Transmission Control Block (TCB). In certain embodiments, the present invention creates a simplified connection object for the proxy which eliminates the overhead associated with keeping TCB's for two connections.

IP

IP is the primary network layer protocol in the Internet suite. In addition to internetwork routing, IP provides error reporting and fragmentation and reassembly of information units called datagrams for transmission over networks with different maximum data unit sizes. IP represents the heart of the Internet protocol suite.

In the TCP/IP protocol, in order to properly route packets, it is necessary to use the source IP address and port number and the destination IP address and port number found in the packet header. These four quantities together will be referred to as a "quad". They will be stored at numerous points and accessed or modified in the system and method taught by the present invention in its various embodiments.

Network Environment and Network Devices

The system and method described herein may be usefully implemented on a number of network devices. Generally, the device on which the present invention is implemented will be referred to as a cut through proxy. As noted above, the term proxy is used to refer to a device which terminates a connection from a client in the place of or as a proxy for another device which is the actual server or target for the client's connection request. In one embodiment, the present invention is implemented as a transparent proxy whose existence and operation is not evident to the client such as is described in U.S. Pat. No. 6,473,406, issued Oct. 29, 2002, entitled "Transparently Proxying a Connection," which was previously incorporated by reference for all purposes.

In one embodiment, the proxy is used to implement user authentication for a private internet exchange (PIX) that includes user authentication and security such as is described in U.S. Pat. No. 5,793,763, issued Aug. 11, 1998, entitled "Security System for Network Address Translation Systems," which is herein incorporated by reference. It should also be noted a transparent proxy may also be a PIX, a firewall, or a web server. A PIX is a network device used to share a single IP address among a number of devices. When a connection is attempted from outside the network served by the PIX, it is often desirable to implement user authentication on the PIX so that the connection will not be made to a device on the network served by the PIX unless the user is authorized to make the connection. Thus, the user or client can log onto the PIX, terminate a connection with the PIX and the security application on the PIX is run to authenticate the user. While reference will be made below to a proxy used as a network security device like the PIX that includes security functions, it should be noted that the cut through proxy may be implemented in other network devices such as a web server or web cache which may or may not include security functions.

In a network security device such as the PIX, once authentication is complete, then it has been determined that the user is authorized to establish the desired connection with a local device on the network. If the PIX were implemented as a conventional proxy, then the PIX would at that point begin relaying information from the first connection socket to the other and vice versa. As described below, the cut through proxy eliminates the need for to maintain both connections. The cut through proxy instead provides a way to join the connections while continuing stateful inspection of each packet that is sent and received so that security restrictions can still be enforced.

FIG. 1 is a block diagram illustrating a fully proxied connection. A client 100 wishes to make a connection to a server 102. It is desirable not to allow client 100 to make a direct connection to server 102. For example, server 102 could contain very sensitive data and client 100 could be a potentially hostile computer. In such a case, a proxy 104 is inserted between client 100 and server 102. Proxy 104 in this example acts as a firewall. Connections are allowed to proxy 104 and proxy 104 relays information from client 100 to server 102 and vice versa. No connection from client 100 to server 102 is allowed.

Proxy 104 maintains a connection to client 100 through a client network stack 106. Proxy 104 maintains a connection to server 102 through a server network stack 108. Each of the network stacks implement the full TCP/IP protocol in order to maintain their respective terminating connections with the client and the server. Data received from the client connections socket is processed by a proxy application 110. Proxy application 110 may implement a security application which checks data received from client 110 to determine whether such data should be relayed to server 102. Likewise, proxy application 10 may monitor data returned from the server on the server connection socket to determine whether such data is authorized to be forwarded to the client.

Thus, proxy 104 terminates a separate connection to both the client and the server and the proxy application relays data received via the two connections from one side to the other. The client connection stack and the server connection stack are implemented in the kernel of the proxy. In one embodiment, the present invention is implemented by first fully proxying a connection as shown above. Once the connection has reached a certain state where certain unproxy criteria are met, the connection is unproxied as described below and the need to maintain the client and server TCP connections is eliminated. Preferably, the initial proxy stage is implemented as a transparent proxy such as is described in U.S. Pat. No. 6,473,406, issued Oct. 29, 2002, entitled "Proxying a Connection," which was previously incorporated by reference for all purposes.

Although a proxy used as a firewall has been described above, it should also be realized that other proxy applications may also be implemented in accordance with the present invention. Specifically, a web server or web cache could terminate a connection with a client, service the data request by the client if the information is cached at the web server, and hand over the connection to another database on a another machine networked to the server in the event that the web cache does not contain the data. When the connection is handed over to the other database, the cut through proxy method of the present invention may be used to reduce the overhead that would otherwise be required by the web cache having to make a fully terminating connection to the client requesting data on one side and a second fully terminated connection to the other database source on the other side.

Overhead Associated with the Proxied Connection

While the arrangement described above effectively isolates the client from the server for security purposes, it does require significant processing and memory overhead on the proxy. As mentioned above, a large number of time consuming copies are required to process the data on one of the network stacks and then send data to the other network stack and out to the other side. The proxy is required to task switch repeatedly while managing a large number of connections. The requirements for a fully terminated TCP connection are described in Transmission Control Protocol RFC 793 and Requirements for Internet Host—Communication Layers RFC 1122. Briefly, maintaining a fully terminated TCP connection involves keeping track of the sequence number of every packet that is sent and received, acknowledging packets that are received, and keeping sent packets available to be resent, if necessary, until they are properly acknowledged. Furthermore, a checksum is calculated for each packet for both the IP header information and the actual data contained in the packet to determine whether an error has occurred in some of the bits during transmission.

As can be readily appreciated, numerous data copies are required in order to perform these packet management functions and a potentially large amount of memory is taken in order to support those functions. The cut through proxy eliminates some of the processing and memory overhead involved in maintaining two fully terminated connections by providing a separate cut-through path. Certain packets are sent directly from their source, whether it be the client or the server, to their destination without the checking and copying required by the TCP protocol being done by a proxy.

Figure 2:
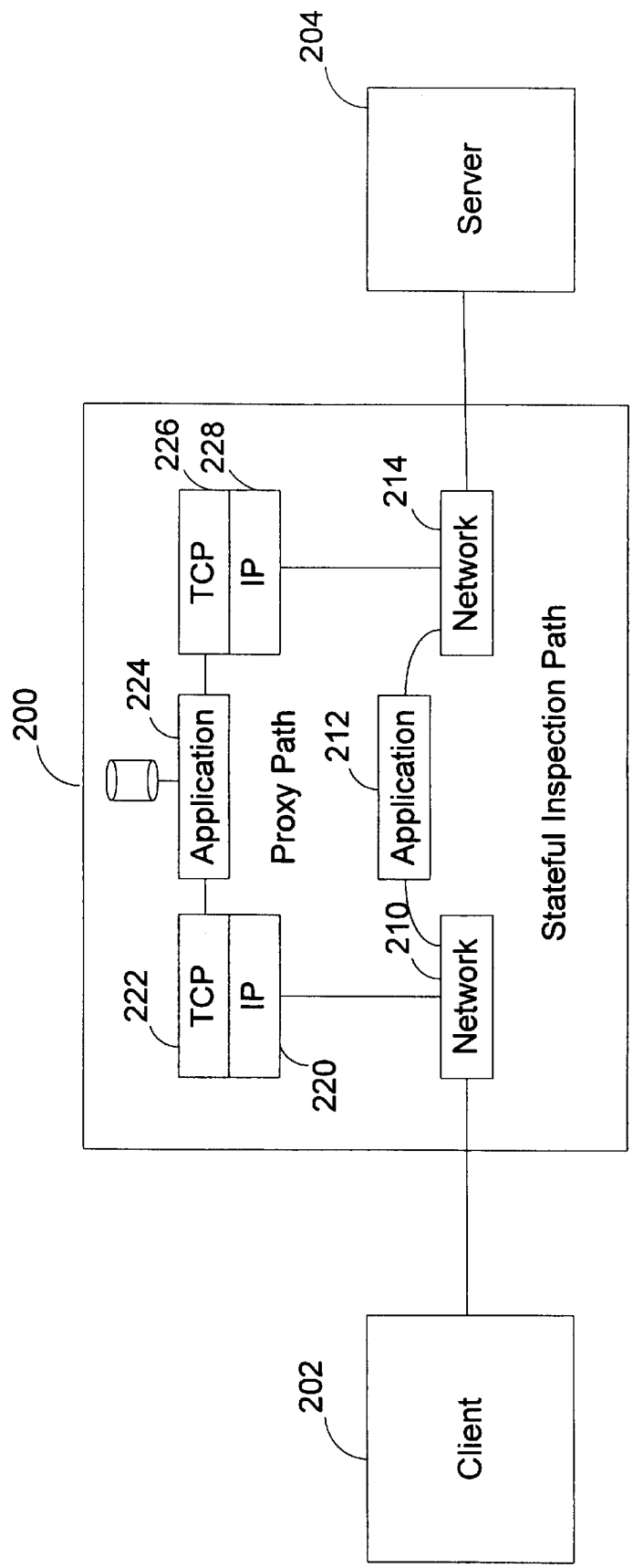
FIG. 2 is a block diagram illustrating a cut-through proxy that provides a fully proxied path that includes two terminated TCP connections similar to the path shown for the proxy in FIG. 1.

FIG. 2 is a block diagram illustrating a cut-through proxy 200 that provides a fully proxied path that includes two terminated TCP connections similar to the path shown for proxy 104 in FIG. 1. Proxy 200 also includes a cut-through path which enables data to be routed from a client 202 to a server 204 without the packets being fully checked by one of the TCP/IP network protocol stacks and routed to the other TCP/IP network protocol stack for relay to the other side. The path that includes the two fully terminated connections is referred to as the participating path because it fully participates in the TCP protocol. The path which does not include two fully terminated connections, the cut-through path, is referred to as the non-participating path because it does not fully participate in the TCP protocol.

Packets which are routed along the participating path are fully proxied and packets which are routed along the non-participating path are inspected and checked in a way that preserves the verification information contained in the packets but does not verify the packet data. Instead of two TCP applications being supported by the cut-through proxy 200 for packets which are routed along the non-participating path, a single virtual TCP connection is maintained between the client and the server. The required management functions including packet checking and packet acknowledging are performed by the client and the server, and not by the cut-through proxy.

This arrangement results in significant processing savings as a result of a greatly reduced number of data copies. Likewise, there is a reduction in memory use because instead of needing to maintain a transmission control block (TCB) for two connections, the cut-through proxy need only maintain a single connection object to keep track of state information for the connection between the client and the server. It should be noted that the non-participating path in the cut-through proxy may also be referred to as the stateful inspection path because the packets are inspected and the state of the connection is maintained in the connection object. The size of a connection object is significantly smaller than the size of a TCB. In one embodiment, the connection object is about 40 bytes long as compared to an average TCB which is about 128 bytes long. In certain embodiments, connection objects are less than 50 bytes and in another embodiment connection objects are less than 80 bytes.

When a data packet comes in from the client, it is received at a physical layer 210. A series of intercepting controller switches (not shown) determine whether the packet should be routed up through the rest of the TCP stack or sent to a non-participating application 212 along the stateful inspection path of the cut-through proxy. The non-participating application inspects packets without acknowledging them or checking the checksums. The non-participating application may check the contents of the packet to determine whether the packet should be authorized or dropped. If the packet is determined by the non-participating application to be appropriate for relaying to the server, then the packet is transferred to a network layer 214 on the server side and is relayed to the server. As is described below, the non-participating application makes certain adjustments to the sequence and acknowledge numbers (hereinafter the sequence and the acknowledgment numbers) in the IP header of each data packet.

Packets which are determined not to be eligible to be passed along the non-participating path are routed up through the rest of the TCP stack through an IP layer 220 and a TCP layer 222. Such packets are handled by a participating application 224 and data from the packets which is deemed appropriate to be relayed to the server is passed to a TCP layer 226 and an IP layer 228 on the server side for eventual relay to the server via physical layer 214. The process for determining the path on which each packet is sent is further described in FIG. 4.

Figure 3:
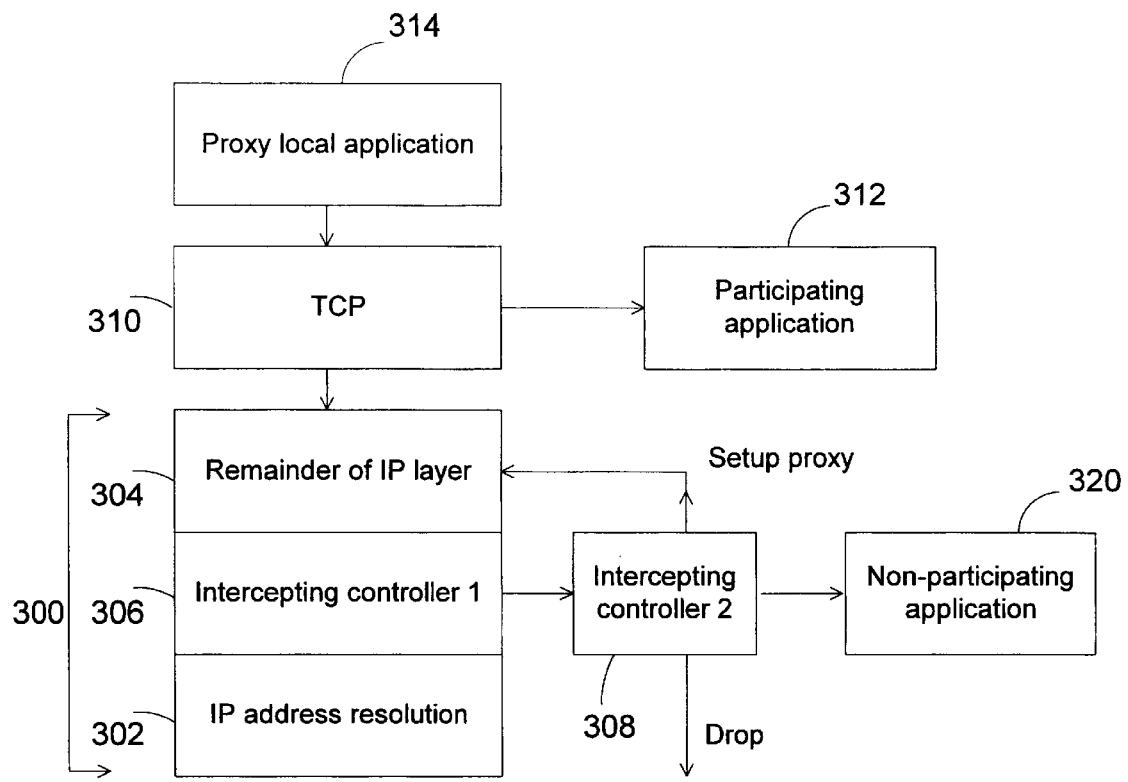
FIG. 3 is a schematic diagram showing in more detail the interface between network layer 210 and IP layer 220 in FIG. 2, illustrating how a packet is routed to either the participating or the non-participating application.

FIG. 3 is a schematic diagram showing in more detail the interface between network layer 210 and IP layer 220 in FIG. 2, illustrating how a packet is routed to either the participating or the non-participating application. An IP layer 300 is split into an IP address resolution portion 302 and the remainder of the IP layer 304. The IP address resolution layer resolves the IP address of an incoming packet. A first intercepting controller 306 routes packets either to the remainder of the IP layer or to a second intercepting controller 308 for further analysis.

In one embodiment, intercepting controller 306 is a packet filter which filters packets based on their quad. Packets are sent by intercepting controller 306 through a TCP layer 310 to be processed by either the participating application 312 or a local proxy application 314 or they are sent to a second intercepting controller 308. The local proxy application is distinguished from other proxy applications because it is "local,", i. e., it does not proxy packets for outside connections instead processes data for the local proxy itself. The TCP layer determines what socket the packet belongs to and puts the packet on the socket that the appropriate application is accessing. Second intercepting controller 308 determines whether the packets routed to it from intercepting controller 306 should be dropped, sent to a non-participating application 320, or returned to the remainder of the IP layer for routing back to the participating application. Thus, the intercepting controllers route packets based on their quads, acting as packet filters to determine which packets should go to the non-participating application and which packets should go to the participating application and which packets should go to a local proxy application which manages the proxy.

Figure 4:
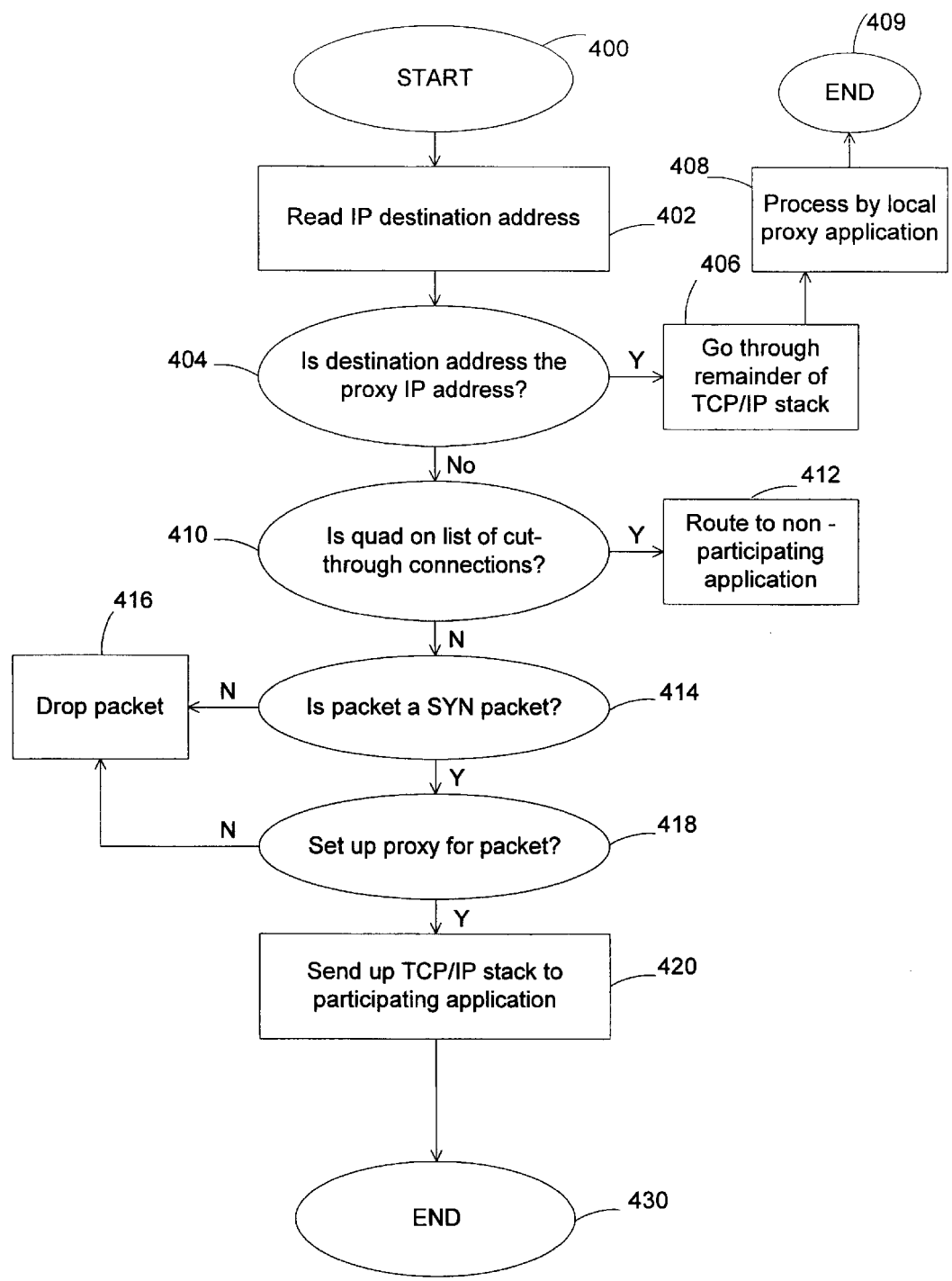
FIG. 4 is a process flow diagram illustrating a process for routing incoming packets to the proxy application, the non-participating application, or the participating application.

FIG. 4 is a process flow diagram illustrating a process for routing incoming packets to the proxy application, the non-participating application, or the participating application. The process starts at 400 when a packet is received by the cut-through proxy. In a step 402, the IP destination address of the packet is read. In a step 404, the processor checks whether the destination address of the packet is the proxy IP address.

If the destination address is the proxy IP address, then the packet is intended for the proxy itself and not for one of the machines serviced by the proxy. Control is transferred to a step 406 and the packet is sent through the remainder of the TCP/IP stack and is processed by a local proxy application in a step 408. The process then ends for that packet at 409. If the destination address of the packet is not the proxy IP address, then control is transferred to a step 410 where it is determined whether the quad of the packet is in the list of cut-through proxied connections. If it is, then control is transferred to a step 412 and the packet is routed to the non-participating application. If the quad is not on the list of cut-through connections, then control is transferred to a step 414 and it is determined whether or not the packet is a synchronize packet. If the packet is not a synchronize packet then control is transferred to a step 416 and the packet is dropped.

If the packet is a synchronize packet then control is transferred to a step 418 and it is determined whether or not the packet is a candidate for a proxied connection. This is generally done based on the IP address and port number of the sender of the packet. If it is determined not to set up a proxy for the packet, then control is transferred to step 416 and the packet is dropped. If the packet is a candidate for a proxied connection, then control is transferred to a step 420 and the packet is sent up the rest of the TCP/IP stack to the participating application for processing. The participating application may set up a proxied connection based on its security or other criteria and also may unproxy the connection at some point so that a cut through proxied connection is created as is described below. The process ends for the packet at 430.

Thus, incoming packets are routed into the participating application, the non-participating application, or the local proxy application, or the packets are dropped. As shown in FIG. 3, a first intercepting controller and a second intercepting controller are used to route the packets. In one embodiment, the intercepting controllers are implemented as a pair of packet filters.

In general, when a new connection is attempted from a client to a server that is supported by the cut-through proxy, the first packets sent by the client establishing the connection and authentication are sent to the participating application. At some point, the participating application determines that authorization is sufficiently complete and that subsequent packets from the client to the server for the same connection may be handled by the non-participating application which performs only stateful inspection without fully terminating connections on the client and server side. As noted above, stateful inspection is a term used to describe how the non-participating application monitors packets and determines whether or not they are appropriate for transfer to the server. The process for handing over a fully proxied connection that includes separate connections on the client and server sides from the participating application to the non-participating application will be described below.

Figure 5:
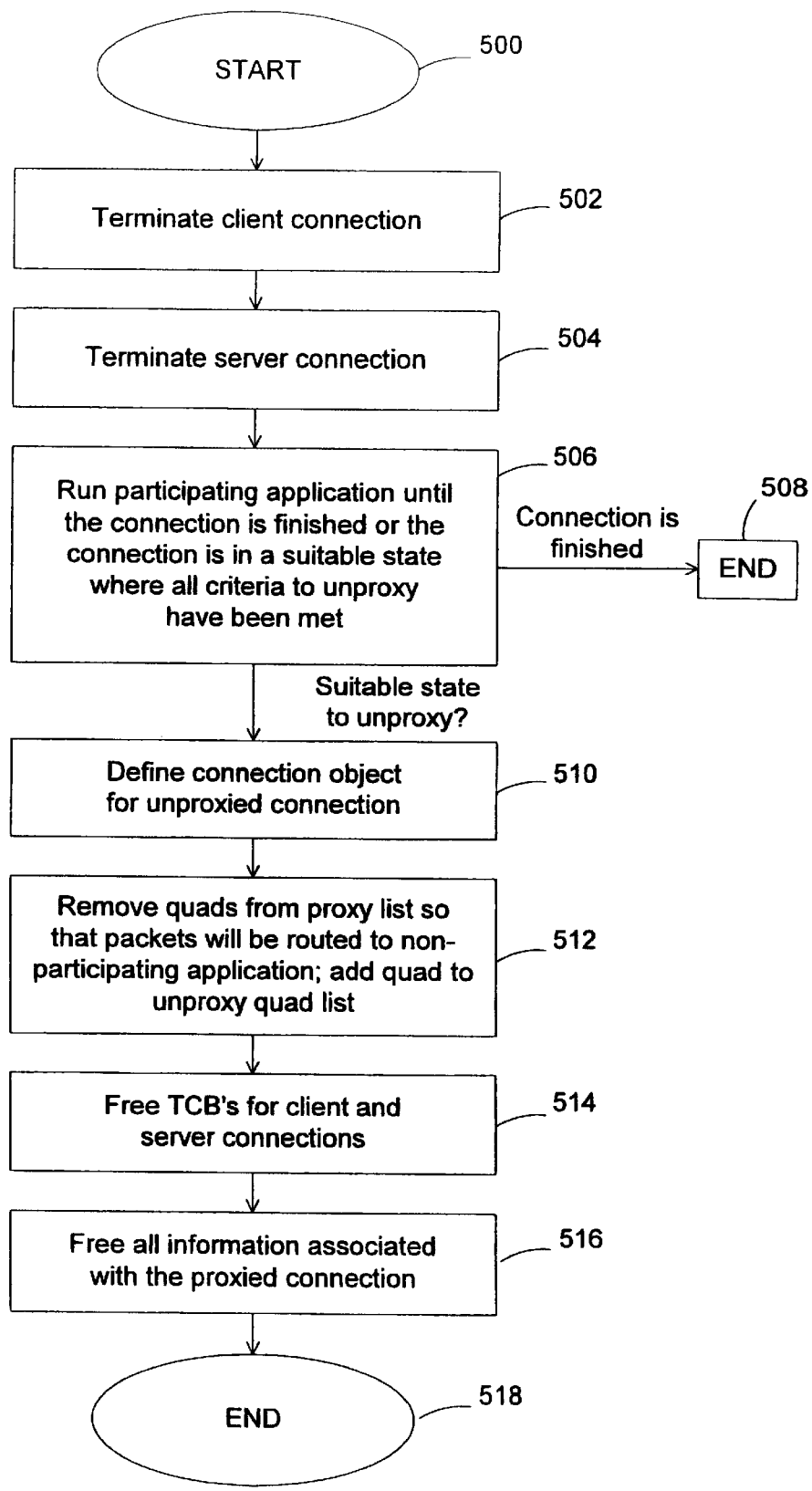
FIG. 5 is a process flow diagram illustrating a process for proxying a connection and then transferring the connection from the participating path to the nonparticipating path in the cut through proxy.

FIG. 5 is a process flow diagram illustrating a process for proxying a connection and then transferring the connection from the participating path to the nonparticipating path in the cut through proxy. This process may also be referred to as unproxying the connection or changing a proxied connection to a cut through proxied connection. The process begins at 500. In a step 502, the participating application terminates a client connection, enabling the participating application to receive information from the client on a socket of the client connection. In some embodiments, authentication of the client is performed before a connection is terminated with the server. If authentication is not successfully completed, then the client is notified and no connection is made to the server. In other embodiments, a connection is made to the server as soon as the client connection is terminated. In a step 504, the participating application terminates a server connection. Next, in a step 506, the participating application runs until the connection is either finished or the connection is in a suitable state where all of the criteria to unproxy the connection have been met. If the connection is finished, then the process ends for that connection at 508.

The criteria to unproxy the application generally fall into two categories which will be referred to as application layer criteria and TCP layer criteria. Before the connection is unproxied, the client application and the server application are interacting with the proxy application. It is necessary to ensure that the applications are in a suitable state to begin interacting directly with each other. The first application layer consideration is security. If the client has not been properly authenticated by the proxy application, then the connection is not in a suitable state to be unproxied. The proxy application first needs to authenticate the client to determine that the client application is authorized to communicate with the server application. Another application layer consideration is that the client connection needs to be in a state where the next message from the client application will be a message that is readable by the server application in its current state. Likewise, the server connection needs to be in a state where the next message from the server application will be a message that is readable by the client application in its current state. The next messages from the client and server must be appropriate for processing by the client or server application without intermediate processing by the proxy.

While the application layer criteria ensure that data can properly be sent between the client and server applications, the TCP layer criteria ensure the handling of packets by the TCP layer in the client and server may proceed without ambiguities or irregularities. In order for the proxy to join the client and server connections without itself participating in the TCP protocol, the connections must both be in a state where sequence synchronization factors $\Delta_1$ and $\Delta_2$ may be calculated for the two connections. The sequence synchronization factors that enable the sequence and acknowledgment numbers of packets sent by the client and server to be adjusted so that they will be synchronized. The procedure for satisfying the TCP layer criteria and for deriving the sequence synchronization factors is described in further detail in FIG. 6.

If the connection is in a suitable state to be unproxied, then control is transferred to a step 510 and a connection object is stored for the unproxied connection. Derivation of the contents of the connection object is further described in FIG. 6. Next, in a step 512, the quads for the terminated client connection and the terminated server connection are removed from the proxy list so that packets corresponding to the unproxied connection will no longer be routed to the participating application. Also in step 512, the quad for the unproxied connection is added to the unproxied quad list so that packets for the unproxied connection will be routed to the nonparticipating application. Handling of packets by the nonparticipating application is described in further detail in FIG. 7. Next, in a step 514, the TCB for the client connection and the TCB for the server connection are freed since those separate connections will no longer be maintained. In a step 516, all other information associated with the formerly proxied and now the unproxied connection is freed as well. The process ends at 518.

Thus, the participating application handles packets during a participating stage and relays information between the client and the server until such time as the participating application is able to determine that the connection is an appropriate connection to be unproxied. Therefore, during this period of time, the full processing and memory overhead burden of maintaining two fully terminated TCP/IP connections is borne by the proxy. However, once the participating application determines that the connection may be appropriately unproxied, the connection is handed off to the nonparticipating application.

Figure 6:
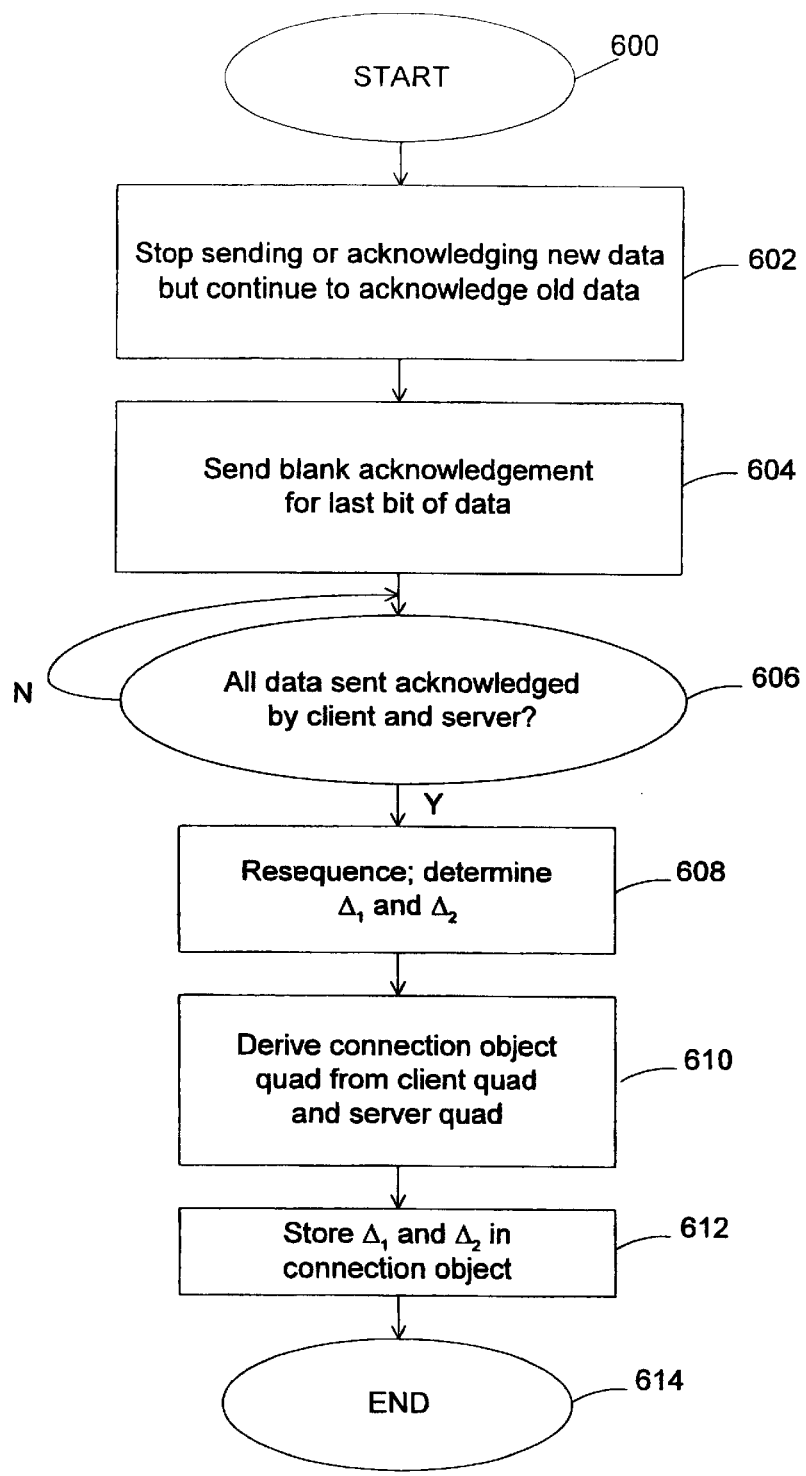
FIG. 6 is a process flow diagram illustrating the process for making sure that the TCP layer criteria are satisfied, for deriving the sequence synchronization factors, and for creating the connection object that is used to synchronize client and server packets.

FIG. 6 is a process flow diagram illustrating the process for making sure that the TCP layer criteria are satisfied, for deriving the sequence synchronization factors, and for creating the connection object that is used to synchronize client and server packets. The process described in FIG. 6 occurs when a connection is transferred from the participating path in the proxy to the nonparticipating path in the proxy. Transferring the connection from the participating path in the proxy to the nonparticipating path in the proxy is referred to as unproxying the connection. The process starts at 600 when the proxy application determines that the connection is in a suitable state from the application layer point of view.

Once the proxy application is satisfied that any required authentication has been performed and that the next data that will be sent by the server will be interpretable by the client and vice versa, it is still necessary that the TCP connection be in a state that can be unproxied. Each packet or datagram that is sent or received by TCP contains a sequence and acknowledgment number. The sequence number functions as a serial number that indicates the beginning byte number of the data in the packet. The acknowledgment number indicates the next byte expected from the other side of the connection. The acknowledgment number thus indicates the last byte that was received from the other side and therefore serves to acknowledge it. The beginning byte number of the client TCP connection is arbitrarily related to the beginning byte number of the server TCP connection. Therefore, it is necessary to derive a sequence synchronization factor that will synchronize the server byte numbers with the client byte numbers.

It should be noted that for the purpose of this description, the term byte number is used. It should be appreciated that the data units to which the sequence numbers apply in different embodiments may correspond to bytes, octets, or any other data unit. Application of the methods described herein to such other data units is within the spirit and scope of the present invention.

Irregularities may result when the connection is unproxied if the connection does not reach an appropriate state before unproxying. For example, if the proxy has sent data to the client side that has not been acknowledged, then the sequence number on the proxy side may not correspond to the acknowledgment number on the client side. As a result, the sequence synchronization factor could be incorrectly derived. Also if the proxy were to acknowledge data on one side and not successfully send the data to the other side before unproxying, that data would be lost since it would not be resent by the side that received the acknowledgment. The following process steps address these and other concerns to ensure that the connection may be unproxied without errors occurring.

In a step 602, the proxy participating application stops sending or acknowledging new data but continues to acknowledge old data. In a step 604, the proxy participating application sends a blank acknowledgment acknowledging the last bit of data received before the application determined to unproxy. It should be noted that the order of steps 602 and 604 is changed or the steps occur simultaneously in different embodiments. Steps 602 and 604 are done for both the client side and the server side. The proxy then waits at a step 606 until all data that it has sent to the client and the server has been acknowledged by the client and the server. When that is true, then control is transferred to a step 608.

Since the proxy stops acknowledgment of new data packets, after step 602, each side may have sent one or more data packets that have never been relayed by the participating application and which have never been acknowledged. According to the TCP/IP protocols running on the client and the server, these packets will be resent by the client or the server in due time and will be acknowledged after the connection is successfully unproxied. When all packets sent to the client and the server have been acknowledged, then the sequence numbers for the client and server agree with the acknowledgment numbers at the proxy and vice versa so that the connection is in an appropriate state to be unproxied. Control is then transferred to a step 608 where the participating application determines the sequence synchronization factors $\Delta_1$ and a $\Delta_2$.

When the connection is unproxied, the sequence and acknowledgment numbers used by the client and server must be synchronized. The two separate proxy connections no longer exist and so it is necessary to adjust the client and server sequence and acknowledgment numbers so that they correspond to each other. $\Delta_1$ is a sequence synchronization factor that is used to compensate for the difference between the sequence number of the next bit that the client will send and the sequence number of the next bit that the server expects to receive from the client. Similarly, $\Delta_2$ is a sequence synchronization factor that compensates for the difference between the sequence number of the next bit that the server will send and the sequence number of the next bit that the client expects to receive from the server.

Thus, each sequence synchronization factor corresponds to the difference between the sequence of the next bit that is to be sent by one side and the sequence number of the next bit that is expected by the other side. $\Delta_1$ and $\Delta_2$ are further described in connection with FIG. 8. Next, in a step 610, a connection object quad is derived from the client proxied connection quad and the server proxied connection quad. The connection object includes the client and server IP addresses and port numbers and thus identifies the unproxied connection. $\Delta_1$ and $\Delta_2$ are stored in the connection object in a step 612 and the process ends at 614.

Once the process described in FIG. 6 is complete, a connection object has been defined and stored for the unproxied connection. The connection object replaces the client TCB associated with the client connection and the server TCB associated with the server connection. As mentioned above, in one embodiment, the connection object is about 40 bytes in size and each TCB is about 128 bytes. The connection object does not keep track of a sequence and acknowledgment byte number for each connection. Instead, the connection object contains the sequence synchronization factors $\Delta_1$ and $\Delta_2$.

The sequence synchronization factors allow the nonparticipating application to alter the IP packet headers from the client and server side so that the sequence and acknowledgment numbers generated by the client and server are synchronized with each other. Thus, the two terminated connections are replaced by a process running in the nonparticipating application that synchronizes the sequence and acknowledgment bit numbers from the client and server sides. Proper sequencing, acknowledging, and message reconstruction is done by the TCP layer in the client and the server without the cut-through proxy fully terminating a TCP connection to either. The connection is unproxied and the function of error checking and keeping track of sequencing and acknowledging packets is performed by the client and the server and not by the proxy participating application. Instead, the proxy nonparticipating application simply adjusts the sequence and acknowledgment bit numbers from the client and the server using the sequence synchronization factors.

It should be noted that the nonparticipating application may still inspect the content of messages and monitor connection events as described above. This process is referred to as stateful inspection. As the cut-through proxy statefully inspects the packets routed through the nonparticipating application, the cut-through proxy may alter information or reject the packets or decide to end an unproxied connection based on unacceptable content being detected in packets by the nonparticipating application.

Figure 7:
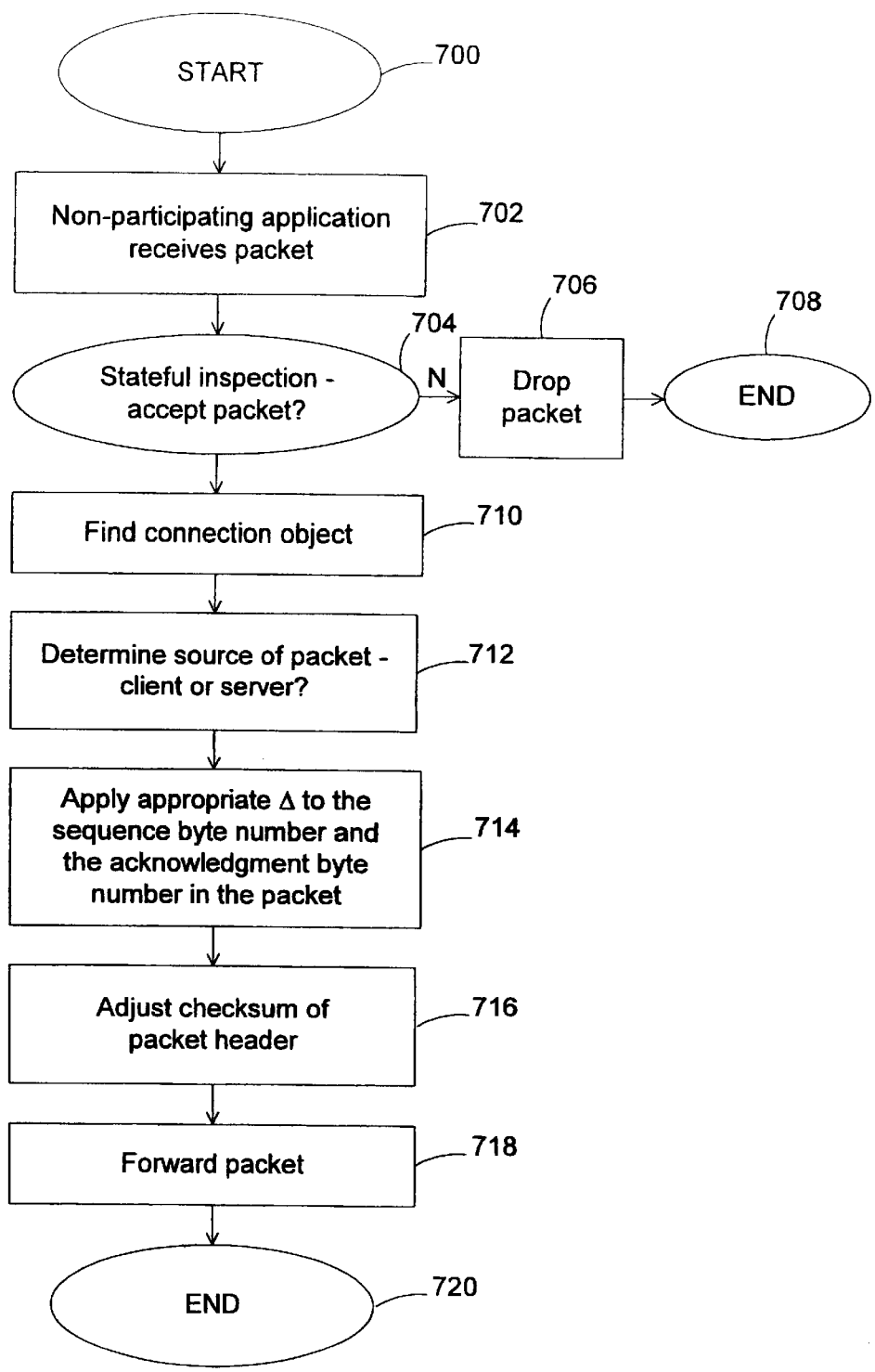
FIG. 7 is a process flow diagram illustrating a process for statefully inspecting and handling a packet on the nonparticipating path.

FIG. 7 is a process flow diagram illustrating a process for statefully inspecting and handling a packet on the nonparticipating path. The process starts at 700. In a step 702 the nonparticipating application receives a packet. Stateful inspection is performed in a step 704 and the nonparticipating application decides whether to accept the packet. Specifically, the data content of the packet is inspected and based on the content of the packet and what the nonparticipating application knows about the state of the connection, the nonparticipating application determines whether or not to drop the packet. In some embodiments, the nonparticipating application may modify the data in the packet if that is determined to be necessary by the nonparticipating application. When this is done, the checksum for the data in the packet is adjusted appropriately. If the packet is not to be accepted, then control is transferred to a step 706 and the packet is dropped and the process ends at 708. If the packet is to be accepted, then the connection object for the object is located in a step 710. In some embodiments, the connection objects for all of the unproxied connections are stored in a hash table. In other embodiments, a linked list or other data structure may be used to facilitate searching for the connection objects.

Next, in a step 712, the source IP address of the packet is read and it is determined whether it corresponds to the client IP address or the server IP address in the quad that is contained in the connection object. In a step 714, the appropriate synchronization factor, $\Delta$, either $\Delta_1$ or $\Delta_2$ is applied to the sequence number in the packet.

With $\Delta_1$ and $\Delta_2$ defined as above, if the source of the packet is the client, then the sequence number of the packet corresponds to the client sequence bit number and $\Delta_1$ is applied so that when the server receives the packet, the sequence number will correspond to the next bit number that the server expects to acknowledge. If the source IP address of the packet corresponds to the server IP address, then $\Delta_2$ is applied so that when the client receives the packet, the sequence number will correspond to the next bit number that the client expects to acknowledge. Likewise, the appropriate synchronization factor is also applied to the acknowledgment bit numbers. Next, in a step 716, the checksum of the packet header is adjusted. In a step 718, the packet is transferred and the process ends at 720.

As mentioned above, while the connection is proxied by the participating application, it appears to the client that the client is communicating not with the proxy, but with the server itself. This is because the proxy intercepts and responds to packets directed from the client to the server and the proxy includes the IP address of the server as the source IP address in packets which it sends to the client. Like the client connection, the server connection made by the proxy is made in such a way that the proxy pretends to the server to be the client by giving the client IP address as the source IP address in the packets which the proxy sends to the server for the purpose of relaying information from the client.

When the connection is unproxied, it is necessary to change the sequence number of packets sent by the client to a sequence number that is synchronized with the sequence number that is expected by the server from the connection that the proxy has made with the server. Likewise, when the connection is unproxied, it is also necessary to change the sequence number of packets sent by the server to a sequence number that is synchronized with the sequence number that is expected by the client from the connection that the proxy has made with the server. Also, the acknowledgment byte numbers sent by the client and server must be adjusted so that they are synchronized with the sequence.

Figure 8:
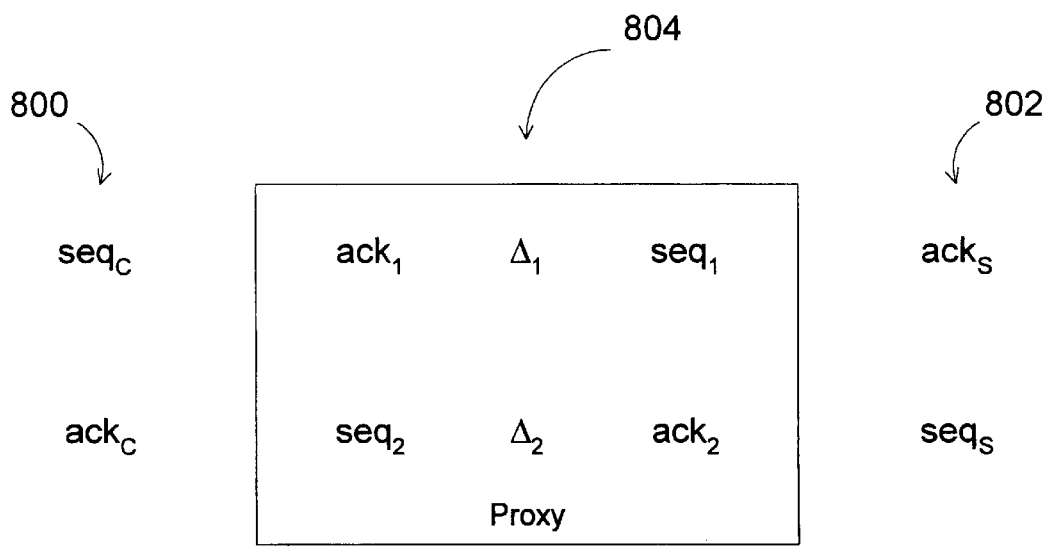
FIG. 8 is a schematic diagram illustrating how the packet synchronization factors $\Delta_1$ and $\Delta_2$ are derived from the sequence and acknowledgment numbers contained in the TCB's associated with the two fully terminated connections that exist while the participating application is fully proxying the connection from the client to the server.

FIG. 8 is a schematic diagram illustrating how the packet synchronization factors $\Delta_1$ and $\Delta_2$ are derived from the sequence and acknowledgment numbers contained in the TCB's associated with the two fully terminated connections that exist while the participating application is fully proxying the connection from the client to the server. On a client side 800, the client has a $seq_c$ byte number and an $ack_c$ byte number. The $seq_c$ byte number indicates the sequence number of the next byte which the client will send to the server. The $ack_c$ byte number is the byte number of the next byte that the client expects to receive from the server.

On a server side 802, a TCB is stored which contains the acknowledgment byte number $ack_s$ of the last packet that the server has acknowledged as well as a sequence number $seq_s$ which stores the sequence byte number of the next data that the server expects to send to the client. It appears to the server that it is communicating directly with the client and it is not evident that the proxy is proxying the connection.

Within a proxy 804, associated with the two TCB's that keep track of the sequencing information that is associated with the fully terminated client connection and the fully terminated server connection, there are stored corresponding sequence and acknowledgment numbers. On the client side, $ack_1$ is the byte number that the proxy expects to receive from the client and $seq_2$ corresponds to the sequence number of the next packet that the proxy expects to send to the client. Likewise, on the server side, $seq_1$ is the sequence number of a next packet that the proxy expects to send to the server and $ack_2$ is the acknowledgment number of the next packet that the proxy expects to receive from the server.

$\Delta_1$ is the client originated packet sequence synchronization factor applied by the nonparticipating application to the sequence number of packet headers of packets originated by the client that are forwarded to the server. $\Delta_1$ is equal to the difference between $seq_1$ and $ack_1$, that is, the difference between the sequence byte number of the next data to be sent to the server on the server connection and the sequence byte number expected by the proxy for the next data that is to be sent by the client. When $\Delta_1$ is applied to sequence byte number of client-originated packets, the sequence number of the forwarded packets is equal to the sequence number that is expected by the server. $\Delta_1$ is also applied to the acknowledgment numbers contained in packets that are sent from the server so that the acknowledgment numbers match the client originated packet sequence numbers that are being acknowledged by the server.

Likewise, $\Delta_2$ is the server originated packet sequence synchronization factor. $\Delta_2$ is equal to the difference between $seq_2$, the sequence number of the next byte that will be sent to the client on the client connection and $ack_2$, the acknowledgment number corresponding to the next byte expected by the proxy from the server. When $\Delta_2$ is applied to the sequence byte number of packets originating from the server, the sequence byte number of those packets is equal to the sequence number that is expected by the client. $\Delta_2$ is also applied to the acknowledgment numbers contained in packets that are sent from the client so that the acknowledgment numbers match the server originated packet sequence numbers that are being acknowledged by the client.

Thus, $\Delta_1$ and $\Delta_2$ enable the nonparticipating application to alter the sequence and acknowledgment byte numbers in the packet IP headers of forwarded packets so that the nonparticipating application need not participate in the TCP protocol. Instead, the sequence and acknowledgment numbers of the packets are adjusted so that the packets from the client and the server are synchronized and the client and the server can perform the packet management functions implemented in the TCP protocol and reliably reconstruct messages.

Figure 9:
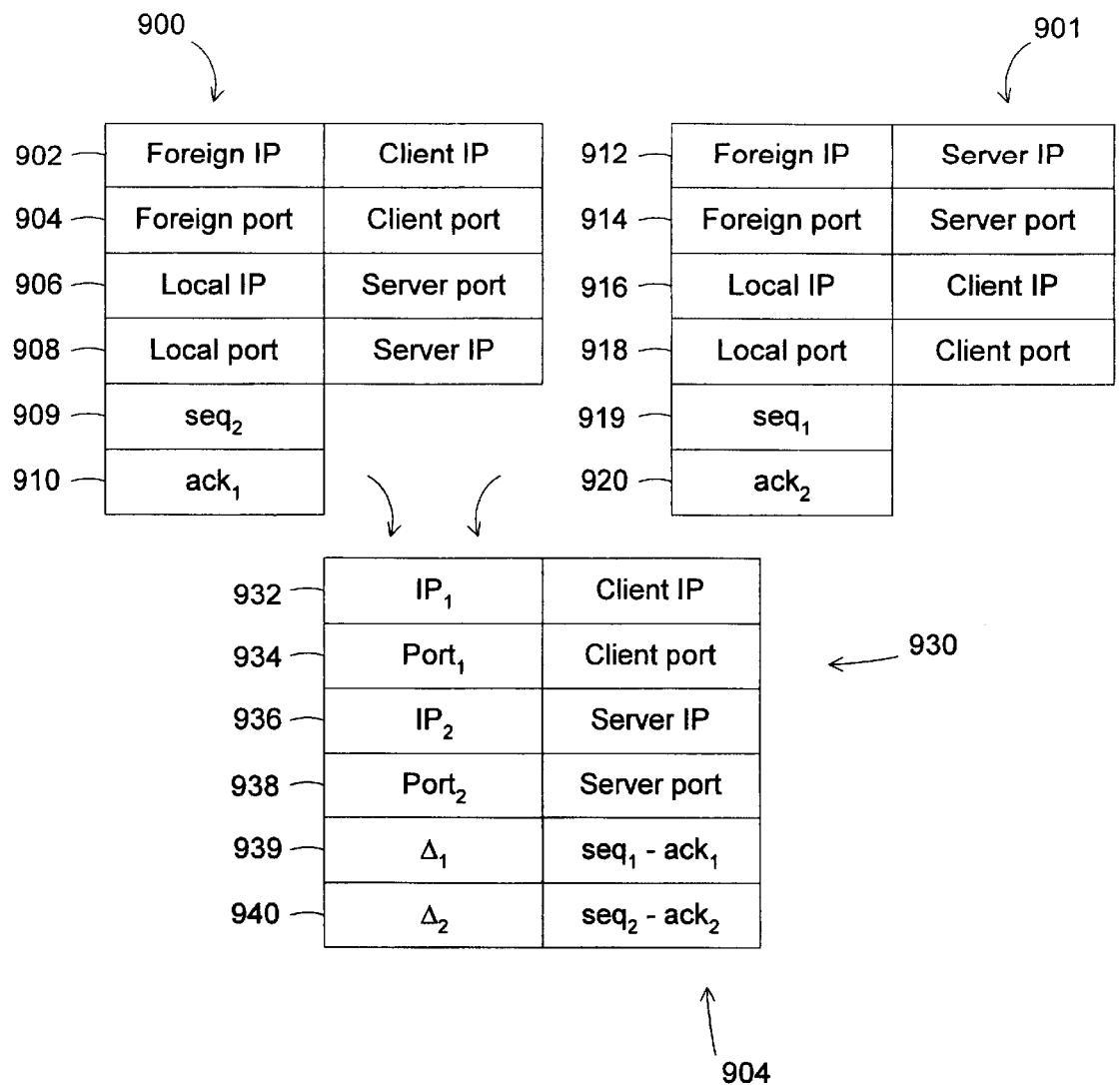
FIG. 9 is a schematic diagram illustrating how the connection object data structure is derived when a proxied connection is unproxied from the TCB's contained in the proxy that are associated with the fully terminated connections to the client and the server.

FIG. 9 is a schematic diagram illustrating how the connection object data structure is derived when a proxied connection is unproxied from the TCB's contained in the proxy that are associated with the fully terminated connections to the client and the server. A client TCB 900 contains a foreign IP address 902, a foreign port number 904, a local IP address 906, and a local port number 908. The foreign IP address stores the client IP address; the foreign port number stores the client port number; the local IP address stores the server IP address; and the local port number stores the server port number. The client TCB also contains a sequence byte number 909 and an acknowledgment byte number 910 for data that is sent to or received from the client.

Likewise, the proxy has a server TCB block 901 which stores the server IP address in a foreign IP address block 912, stores the server port number in a foreign port number block 914, stores the client IP address in a local IP address block 916, and stores the client port number in a local port number block 918. A sequence number 919 is stored for the next packet to be sent to the server and an acknowledgment number 920 is stored for the next packet which is expected from the server. When a connection object 930 is defined, information from the client TCB block and the server TCB block is combined to form the connection object which contains all the necessary information for the nonparticipating application to alter IP packet headers and relay packets between the client and the server.

Connection object 930 includes a first IP address 932 which is designated as $IP_1$ to indicate that it is neither a foreign nor a local IP address because the connection object will be used to relay packets in both directions. $IP_1$ stores the client IP address. Likewise a first port number 934 is designated $port_1$ and it contains the client port number. A second IP address 936 is designated $IP_2$ and it stores the server IP address and a second port number 938 is designated $port_2$. It stores the server port number. A client originated packet sequence synchronization factor 939 is labeled $\Delta_1$ and a server originated packet sequence synchronization factor 940 is also stored in the connection object. Thus, the connection object contains the IP address and port numbers needed to identify packets which are to be unproxied as well as the packet sequencing compensation factors required to adjust the sequence and acknowledgment byte numbers of packets so that they may be acknowledged by the client and/or the server.

As noted above, when the nonparticipating application alters IP packet headers, the IP packet header checksum is adjusted accordingly. Likewise, when the nonparticipating application alters data, the TCP checksum is also adjusted accordingly. In a preferred embodiment, checksums are adjusted or incremented according to changes made in the data as is known in the art and described in the TCP RFC's. Checksums are preferably not recalculated from the beginning. Thus, the nonparticipating application does not check for errors and then recalculate checksums. Instead, the nonparticipating application passes along errors that occur in packets and increments the checksums to reflect changes so that the client and server applications may detect the errors.

Figure 10:
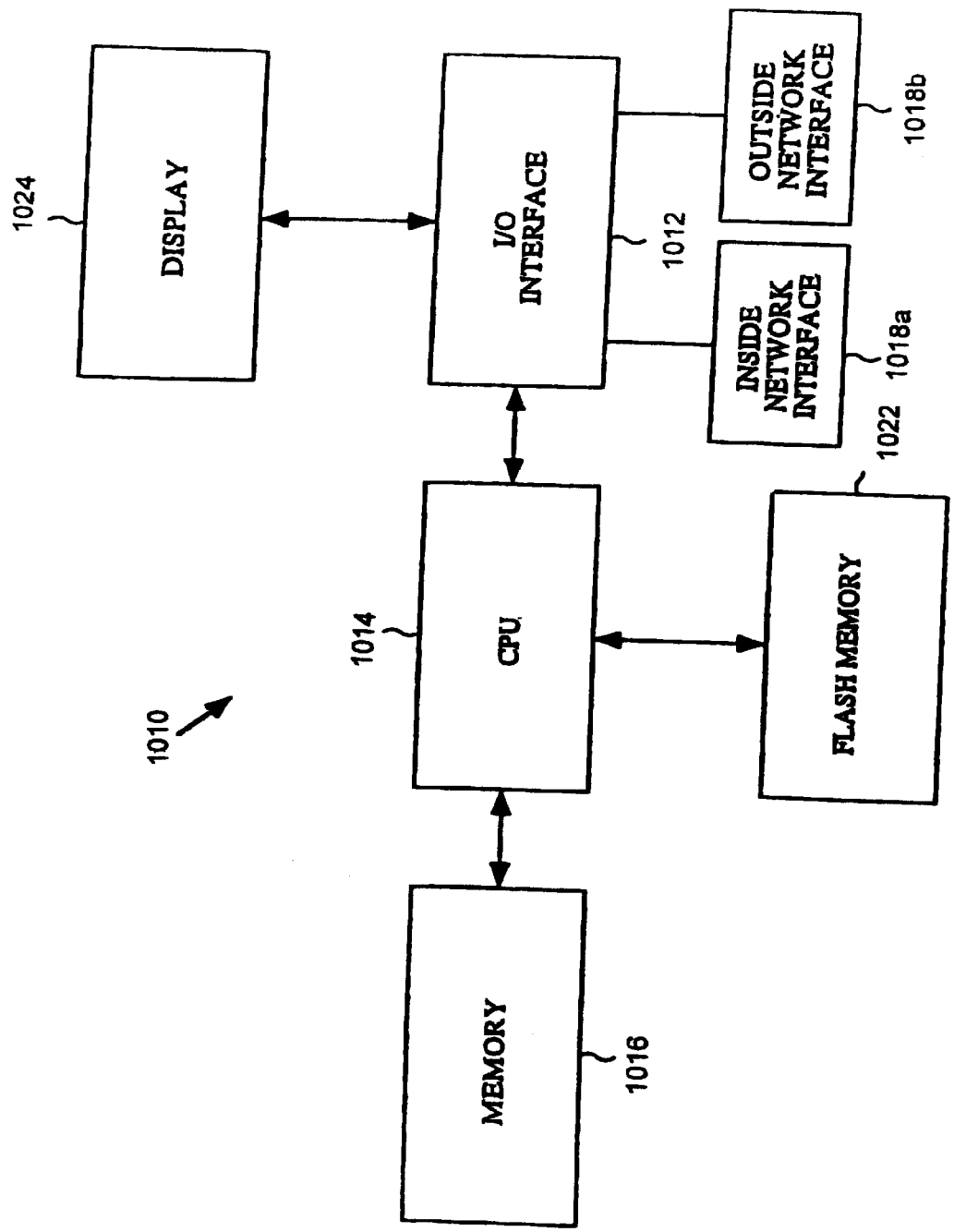
FIG. 10 shows a typical computer-based system which may be used as a transparent proxy.

FIG. 10 shows a typical computer-based system which may be used as a transparent proxy. Shown is a computer 1010 which comprises an input/output circuit 1012 used to communicate information in appropriately structured form to and from the parts of computer 1010 and associated equipment, a central processing unit 1014, and a memory 1016. These components are those typically found in most general and special purpose computers 1010 and are intended to be representative of this broad category of data processors.

Connected to the input/output circuit 1012 are inside and outside high speed Local Area Network interfaces 1018a and 1018b. The inside interface 1018a will be connected to a private network, while the outside interface 1018b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 1018a and 1018b are preferably multiport Ethernet interfaces, but may be other appropriate interfaces such as FDDI interfaces, etc.

The computer system may also include an input device (not shown) such as a keyboard. A flash memory device 1022 is coupled to the input/output circuit 1012 and provides additional storage capability for the computer 1010. The flash memory device 1022 may be used to store programs, data and the like and may be replaced with a magnetic storage medium or some other well-known device. It will be appreciated that the information retained within the flash memory device 1022, may, in appropriate cases, be incorporated in standard fashion into computer 1010 as part of the memory 1016.

In addition, a display monitor 1024 is illustrated which is used to display the images being generated by the present invention. Such a display monitor 1024 may take the form of any of several well-known varieties of cathode ray tube displays and flat panel displays or some other type of display.

Although the system shown in FIG. 10 is a preferred computer system of the present invention, the displayed computer architecture is by no means the only architecture on which the present invention can be implemented. For example, other types of interfaces and media could also be used with the computer.

A cut through proxy has been disclosed for reducing overhead on a proxy for certain connections. Packets are handled by the nonparticipating application in a manner that does not require the data in the packet to be copied to the application layer and requires only minimum processing by the nonparticipating application. This saves both processing. and memory resources in the cut through proxy. The connection overhead associated with implementing the TCP protocol is significantly reduced for unproxied applications on the cut through proxy. Sequence and acknowledgment byte numbers, error checking functions and resends are handled by the client end server.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. For example, as noted above, the present invention is implemented on a PIX in one embodiment. In other embodiments, the present invention is implemented on a firewall or a multi-homed web server. Accordingly, the present embodiments are to be considered as illustrative and not restrictive, and the invention is not to be limited to the details given herein, but may be modified within the scope and equivalents of the appended claims.

What is claimed is:

1. A method of bypassing a participating application that receives data from a client connection between a proxy and a client and receives data from a server connection between a proxy and a server comprising:

deriving a client originated packet sequence synchronization factor, the client originated packet sequence synchronization factor being derived from a difference between a last data sequence number sent by a participating application to a server and a last data acknowledgment number sent by the participating application to a client, wherein the participating application participates in a transport protocol;

deriving a server originated packet sequence synchronization factor, the server originated packet sequence synchronization factor being derived from a difference between a last data sequence number sent by the participating application to the client and a last data acknowledgment number sent by the participating application to the server;

adjusting a server originated data sequence number of a packet sent from the server to the client using the server originated packet sequence synchronization factor;

adjusting a client originated data acknowledgment number of a packet sent from the client to the server using the server originated packet sequence synchronization factor;

adjusting a client originated data sequence number of a packet sent from the client to the server using the client originated packet sequence synchronization factor;

adjusting a server originated data acknowledgment number of a packet sent from the server to the client using the client originated packet sequence synchronization factor;

whereby data sequence and acknowledgment numbers are synchronized between the client and the server; and initiating a non-participating application operable to communicate data between the client and the server, wherein the non-participating application does not participate in the transport protocol and wherein the nonparticipating application is operable to communicate data using the client originated packet sequence synchronization factor and the server originated packet sequence synchronization factor.

2. A method as recited in claim 1 wherein the data is received by the non-participating application in the form of incoming data packets and the incoming data packets are not acknowledged by the non-participating application.

3. A method as recited in claim 1 wherein the data is received by the non-participating application in the form of incoming data packets and the checksum of the incoming data packets is not checked.

4. A method as recited in claim 1 wherein the data is received by the non-participating application in the form of incoming data packets, the data packets including packet headers having data checksums and IP checksums and wherein the data checksums and IP checksums are incremented and not checked by the non-participating application.

5. A method as recited in claim 1 further including defining a connection object including a quad, the quad including a client IP address, a server IP address, a client port number, and a server port number wherein the data is received in the form of incoming data packets, the data packets including packet headers, and the connection object is used to modify the packet headers.

6. A method as recited in claim 5 wherein the connection object further includes a client originated packet sequence synchronization factor and a server originated packet sequence synchronization factor wherein the client originated packet sequence synchronization factor is derived from the difference between the last data sequence number sent by the participating application to the server and the last data acknowledgment number sent by the participating application to the client and the server originated packet sequence synchronization factor is derived from the difference between the last data sequence number sent by the participating application to the client and the last data acknowledgment number sent by the participating application to the server.

7. The method of claim 1, wherein the transport protocol comprises Transmission Control Protocol.

8. A computer program product for unproxying a connection between a client and a server, the computer program product being embodied in a computer readable medium and comprising computer instructions for generating a connection object, the connection object comprising:

a quad, the quad including a client IP address, a server IP address, a client port number, and a server port number;

a client originated packet sequence synchronization factor, the client originated packet sequence synchronization factor being derived from a difference between a last data sequence number sent by a participating application, wherein the participating application participates in a transport protocol, to a server and a last data acknowledgment number sent by the participating application to a client; and a server originated packet sequence synchronization factor, the server originated packet sequence synchronization factor being derived from a difference between a last data sequence number sent by the participating application to the client and a last data acknowledgment number sent by the participating application to the server;

wherein the connection object is suitable for modifying packet headers in packets relayed between the client and the server and wherein the connection object is suitable for communicating data between the client and the server without participating in the transport protocol.

9. The computer program product of claim 8, wherein the connection object is configured to modify the packet headers by adjusting a server originated data sequence number of a packet sent from the server to the client using the server originated packet sequence synchronization factor.

10. The computer program product of claim 8, wherein the connection object is configured to modify the packet headers by adjusting a client originated data acknowledgement number of a packet sent from the client to the server using the server originated packet sequence synchronization factor.

11. The computer program product of claim 8, wherein the connection object is configured to modify the packet headers by adjusting a client originated data sequence number of a packet sent from the client to the server using the client originated packet sequence synchronization factor.

12. The computer program product of claim 8, wherein the connection object is configured to modify the packet headers by adjusting a server originated data acknowledgment number of a packet sent from the server to the client using the client originated packet sequence synchronization factor.

13. The computer program product of claim 8, wherein the transport protocol comprises Transmission Control Protocol.

14. A computer program product for unproxying a connection between a client and a server, the computer program product being embodied in a computer readable medium and comprising computer instructions for:

deriving a client originated packet sequence synchronization factor, the client originated packet sequence synchronization factor being derived from a difference between a last data sequence number sent by a participating application, wherein the participating application participates in a transport protocol, to a server and a last data acknowledgment number sent by the participating application to a client;

deriving a server originated packet sequence synchronization factor being derived from a difference between a last data sequence number sent by the participating application to the client and a last data acknowledgment number sent by the participating application to the server;

adjusting a server originated data sequence number of a packet sent from the server to the client using the server originated packet sequence synchronization adjusting a client originated data acknowledgment number of a packet sent from the client to the server using the server originated packet sequence synchronization factor;

adjusting a client originated data sequence number of a packet sent from the client to the server using the client originated packet sequence synchronization factor; and adjusting a server originated data acknowledgment number of a packet sent from the server to the client using the client originated packet sequence synchronization factor; and initiating a non-participating application to communicate data between the client and the server, wherein the non-participating application does not participate in the transport protocol and wherein the non-participating application communicates the data using the server originated data sequence number, the client originated data acknowledgment, the client originated data sequence number, and the server originated data acknowledgment number.

15. The computer program product of claim 14, wherein the transport protocol comprises Transmission Control Protocol.

16. The computer program product of claim 14, wherein the data is received by the non-participating application in the form of incoming data packets and the incoming data packets are not acknowledged by the non-participating application.

17. The computer program product of claim 14, wherein the data is received by the non-participating application in the form of incoming data packets and the checksum of the incoming data packets is not checked.

18. The computer program product of claim 14, wherein the data is received by the non-participating application in the form of incoming data packets, the data packets including packet headers having data checksums and IP checksums and wherein the data checksums and IP checksums are incremented and not checked by the non-participating application.

19. The computer program product of claim 14, the computer program product further comprising instructions for defining a connection object including a quad, the quad including a client IP address, a server IP address, a client port number, and a server port number wherein the data is received in the form of incoming data packets, the data packets including packet headers, and the connection object is used to modify the packet headers.

20. A system for unproxying a connection between a client and a server, the system comprising:
    a processor configured to execute computer instructions;
    a first network connection to a client;
    a second network connection to a server; and
    memory associated with the processor and configured to store computer instructions executable by the processor, the computer instructions comprising computer instructions for:
        deriving a client originated packet sequence synchronization factor, the client originated packet sequence synchronization factor being derived from a difference between a last data sequence number sent by a participating application to the server, wherein the participating application participates in a transport protocol, and a last data acknowledgment number sent by the participating application to the client;
        deriving a server originated packet sequence synchronization factor, the server originated packet sequence synchronization factor being derived from a difference between a last data sequence number sent by the participating application to the client and a last data acknowledgment number sent by the participating application to the server;
        adjusting a server originated data sequence number of a packet sent from the server to the client using the server originated packet sequence synchronization factor;
        adjusting a client originated data acknowledgment number of a packet sent from the client to the server using the server originated packet sequence synchronization factor;
        adjusting a client originated data sequence number of a packet sent from the client to the server using the client originated packet sequence synchronization factor;
        adjusting a server originated data acknowledgment number of a packet sent from the server to the client using the client originated packet sequence synchronization factor; and
        initiating a non-participating application to communicate data between the client and the server, wherein the non-participating application does not participate in the transport protocol and wherein the non-participating application communicates the data using the server originated data sequence number, the client originated data acknowledgment, the client originated data sequence number, and the server originated data acknowledgment number.

21. The system of claim 20, wherein the transport protocol comprises Transmission Control Protocol.

22. The system of claim 20, wherein the data is received by the non-participating application in the form of incoming data packets and the incoming data packets are not acknowledged by the non-participating application.

23. The system of claim 20, wherein the data is received by the non-participating application in the form of incoming data packets and the checksum of the incoming data packets is not checked.

24. The system of claim 20, wherein the data is received by the non-participating application in the form of incoming data packets, the data packets including packet headers having data checksums and IP checksums and wherein the data checksums and IP checksums are incremented and not checked by the non-participating application.

25. The system of claim 20, the computer instructions further comprising computer instructions for defining a connection object including a quad, the quad including a client IP address, a server IP address, a client port number, and a server port number wherein the data is received in the form of incoming data packets, the data packets including packet headers, and the connection object is used to modify the packet headers.

26. A system for unproxying a connection between a client and a server, the system comprising:
    means for deriving a client originated packet sequence synchronization factor, the client originated packet sequence synchronization factor being derived from a difference between a last data sequence number sent by a participating application, wherein the participating application participates in a transport protocol, to a server and a last data acknowledgment number sent by the participating application to a client;
    means for deriving a server originated packet sequence synchronization factor, the server originated packet sequence synchronization factor being derived from a difference between a last data sequence number sent by the participating application to the client and a last data acknowledgment number sent by the participating application to the server;
    means for adjusting a server originated data sequence number of a packet sent from the server to the client using the server originated packet sequence synchronization factor;
    means for adjusting a client originated data acknowledgment number of a packet sent from the client to the server using the server originated packet sequence synchronization factor;
    means for adjusting a client originated data sequence number of a packet sent from the client to the server using the client originated packet sequence synchronization factor; and
    means for adjusting a server originated data acknowledgment number of a packet sent from the server to the client using the client originated packet sequence synchronization factor; and means for initiating a non-participating application to communicate data between the client and the server, wherein the non-participating application does not participate in the transport protocol and wherein the non-participating application communicates the data using the server originated data sequence number, the client originated data acknowledgment, the client originated data sequence number, and the server originated data acknowledgment number.

27. The system of claim 26, wherein the transport protocol comprises Transmission Control Protocol.

28. The system of claim 26, wherein the data is received by the non-participating application in the form of incoming data packets and the incoming data packets are not acknowledged by the non-participating application.

29. The system of claim 26, wherein the data is received by the non-participating application in the form of incoming data packets and the checksum of the incoming data packets is not checked.

30. The system of claim 26, wherein the data is received by the non-participating application in the form of incoming data packets, the data packets including packet headers having data checksums and IP checksums and wherein the data checksums and IP checksums are incremented and not checked by the non-participating application.

31. The system of claim 26, further comprising means for defining a connection object including a quad, the quad including a client IP address, a server IP address, a client port number, and a server port number wherein the data is received in the form of incoming data packets, the data packets including packet headers, and the connection object is used to modify the packet headers.

* * * * *